United States Patent [19]

Bland

[11] 4,384,835
[45] May 24, 1983

[54] APPARATUS FOR THE PRODUCTION OF BEADS FROM MOLTEN MATERIALS

[76] Inventor: Roger P. Bland, 41 Paddock Wood, Prudhoe, Northumberland, England

[21] Appl. No.: 287,530

[22] Filed: Jul. 27, 1981

[51] Int. Cl.³ ............................................... B22F 9/00
[52] U.S. Cl. .......................................... 425/7; 425/10
[58] Field of Search ...................................... 425/7, 10

[56] References Cited

U.S. PATENT DOCUMENTS

| 1,612,167 | 12/1926 | Beardsley et al. | 425/10 |
| 2,570,423 | 10/1951 | Batchelder et al. | 425/10 |
| 3,530,207 | 9/1970 | Scheer | 425/10 |
| 3,729,278 | 4/1973 | Lysher | 425/10 |
| 4,285,645 | 8/1981 | Bezz et al. | 425/10 |

FOREIGN PATENT DOCUMENTS

| 762700 | 12/1956 | United Kingdom . |
| 963503 | 7/1964 | United Kingdom . |
| 1134533 | 11/1968 | United Kingdom . |
| 1174762 | 12/1969 | United Kingdom . |
| 1367097 | 9/1974 | United Kingdom . |
| 1384103 | 2/1975 | United Kingdom . |
| 1384104 | 2/1975 | United Kingdom . |
| 1411131 | 10/1975 | United Kingdom . |

*Primary Examiner*—James R. Hall
*Attorney, Agent, or Firm*—Brumbaugh, Graves, Donohue & Raymond

[57] ABSTRACT

The production of wax beads from molten material comprises releasing droplets from nozzles contained within a tank which is filled with water. The water adjacent the nozzles is maintained at a temperature above the melting point of the wax by means of steam coils. As the wax droplets formed by the nozzles rise through the column of water they cool and solidify to form spherical beads. The solidified beads which float on the water are separated from the water over a weir and are collected and dried.

8 Claims, 3 Drawing Figures

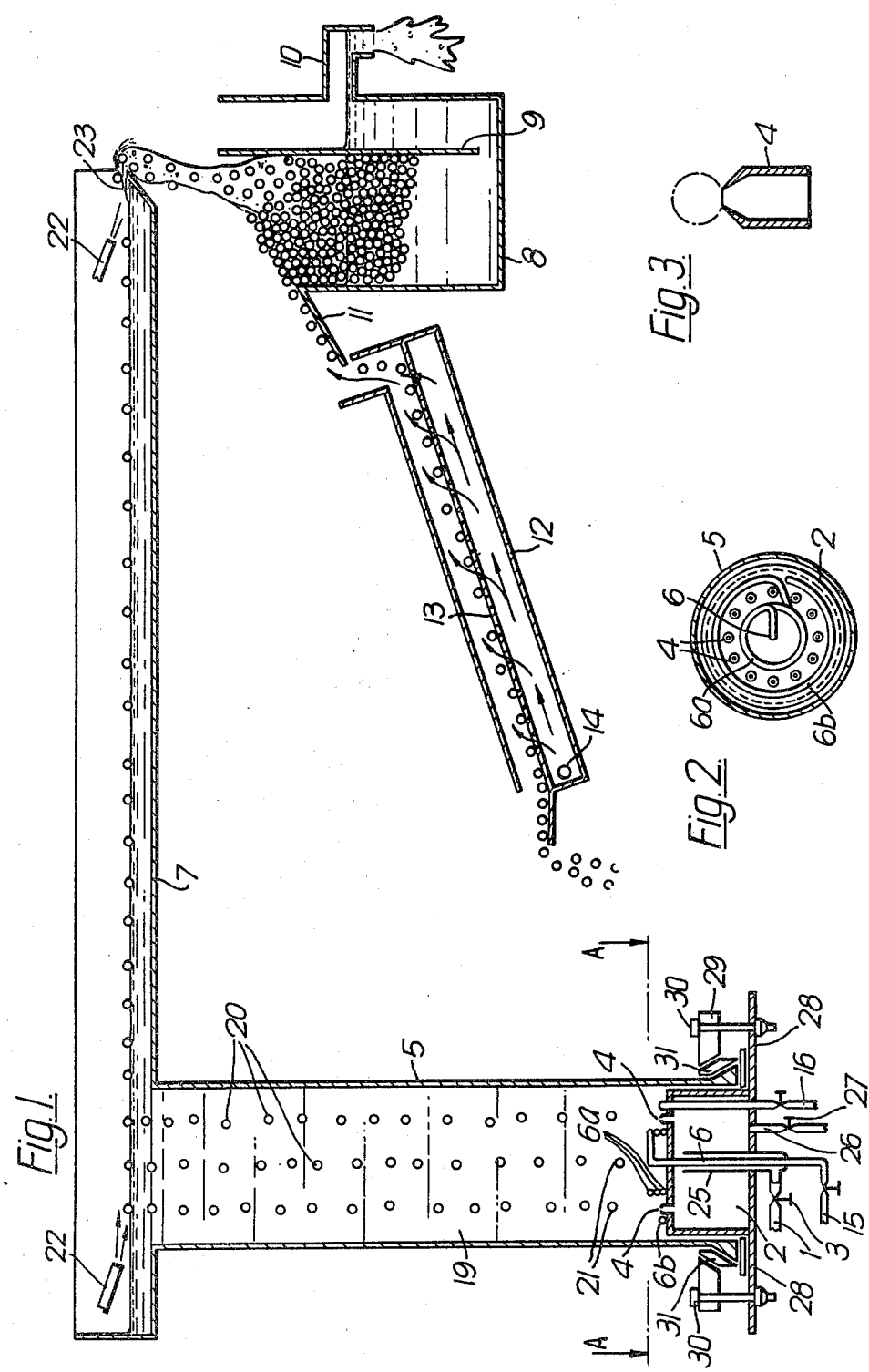

APPARATUS FOR THE PRODUCTION OF BEADS FROM MOLTEN MATERIALS

FIELD OF THE INVENTION

The present invention relates to a method and apparatus for producing beads from molten material.

DESCRIPTION OF THE PRIOR ART

It is known to drop molten wax on a stainless steel belt, where it solidifies, but such a method is disadvantageous because the beads are not spherical.

One known method of producing granules of paraffin, wax and other fusible substances is disclosed in British Patent Specification No. 1,411,131. This method comprises melting the fusible substance and projecting the resulting molten substance upwardly under a positive pressure in a space, and supplying an upwardly moving stream of cooling fluid in the space. In this method, the molten substance is continuously within the upwardly moving stream of cooling fluid both whilst the substance moves upwardly in the space and whilst it moves downwardly in the space.

A process relating to the producing of powdered paraffin wax is disclosed in British Patent Specification No. 1,384,103. This method comprises bringing molten paraffin wax to a temperature in the range 50° to 70° C., spraying the molten paraffin wax into cold air flowing at a velocity sufficient to entrain the paraffin wax in the cold air, maintaining the mixture of paraffin wax and air until the paraffin solidifies, and separating the powdered paraffin wax from the air.

SUMMARY OF THE INVENTION

According to a first aspect of the present invention there is provided a method of producing beads from molten material including the steps of: releasing discrete droplets of said material within a body of a denser liquid; maintaining the liquid in the zone of release of the material at a temperature equal to or higher than the melting point of the material; cooling the liquid in the upper zones of said body so that as the droplets of material rise they are cooled to form beads; and removing the beads from the surface of the liquid.

The beads are usually generally spherical, and may be between 0.001 to 10 mm in diameter.

According to a second aspect of the present invention there is provided apparatus for the production of beads from molten or thermoplastics material including: apparatus for the production of beads from molten material including: a container for holding a liquid; an inlet in said container for conveying said material for release within the liquid; at least one bead-forming nozzle in a lower zone of said container connected to said inlet; means for maintaining a temperature gradient within said liquid such that the temperature of the liquid adjacent the nozzle exceeds the temperature at the surface; and means for removing beads from the surface of the liquid.

Preferably said material is wax and said liquid is water.

Preferably there is a heater within the container. Preferably said means for removing beads comprises: means for bleeding off said beads and a portion of said liquid; means for separating said beads and the bled off liquid; and means for drying said beads.

It is an advantage of the above method and apparatus of producing beads, in particular wax beads, from molten material, that discrete droplets of the wax are released within the body of a denser liquid, in particular water, and that the water is maintained in the zone of release of the wax at a temperature which is equal to or higher than the melting point of the wax.

Furthermore, the advantage of maintaining the temperature gradient between the zone in which the wax is released and the top of the body of water, ensures that the beads of wax solidify as they rise to the surface of the water.

BRIEF DESCRIPTION OF THE DRAWING

The present invention will now be described in greater detail by way of example with reference to the accompanying drawings, wherein:

FIG. 1 is a section through a bead-forming apparatus;

FIG. 2 is a section through the same apparatus taken along the line A—A of FIG. 1; and FIG. 3 is a section through one of the nozzles.

DESCRIPTION OF THE PREFERRED EMBODIMENT

The apparatus shown in FIG. 1 has an inlet 1 for the supply of molten wax to a reservoir 2. The rate of flow of the wax through the inlet 1 is controlled by a tap 3, the wax passing from the inlet 1 to nozzles 4 via the reservoir 2. The shape of the nozzles 4 is shown in greater detail in FIG. 3, and is such that there is water below the point of formation of the bead and the nozzle is provided with a chamfered edge. Droplets 21 are formed by the nozzles 4 within the body of water 19 contained by a tank 5. The diameter of these droplets 21 is dependent on the diameter of the nozzles 4, and can be from 0.001 to 10 mm. The water 19 adjacent the nozzles 4 is maintained at a temperature above the melting point of the wax by means of a steam coil 6 (see FIG. 2) having an inlet 15 and an outlet 16, the steam coil 6 passing up through the centre of a concentric tube 25 carrying the wax from the inlet 1 to the top of the wax reservoir 2. As shown, the steam coil 6 having passed up through the centre of the tube 25 makes three turns 6a inside the circular row of nozzles 4 and one turn 6b outside the circular row of nozzles 4, before passing down through the wax reservoir 2 near the wall thereof to the outlet 16.

Due to the fact that the tube 25 is designed to surround the upward rising steam inlet pipe, the hot steam inlet does not come into contact with any water which may be in the wax reservoir 2. Without this coaxial arrangement of the tubes, any water in the wax reservoir would begin to boil and disrupt the steady flow of wax through the nozzles 4.

A water drain outlet pipe 26 and a tap 27 is provided at the bottom of the wax reservoir 2 to drain off any water which has accumulated therein. Water penetration into the wax reservoir 2 may arise if wax is not flowing upwards through the nozzles 4.

Since the wax in the reservoir 2 is less dense than the water contained in the tank 5, the droplets 21 rise in the tank 5. As they get further away from the steam coil 6 the temperature of the surrounding water 19 decreases, and eventually the droplets solidify to form spherical beads 20. The beads 20 and some of the water 19 are bled off by means of a trough 7. The bleeding operation is performed by a flow of water along the trough or by a fine water jet or a jet of air and water issuing from nozzles 22, which firstly moves the beads away from the top of the column and secondly over the edge of a weir 23 at the far end of the trough 7. Furthermore the jets of water or water/air provide additional cooling for the beads. After passing over the weir 23, the beads fall into a separator 8, between the left-hand wall thereof as seen in FIG. 1, and a baffle 9. The water 19 can flow under the baffle 9 and out through an outlet 10. However, the beads 20, being lighter float on the surface of the water 19 and are trapped. They spill over down a ramp 11 into a drying tube 12. They flow or roll down a perforated screen 13, being dried meanwhile, by means of air flowing up through the screen 13 from an air inlet 14. They are collected as they emerge from the drying tube 12.

The bottom of the wax reservoir 2 extends as a flange 28 at the lower end of the tank 5. The reservoir 2 is clamped to the tank 5 by means of an annular metal ring 29 which is held by bolts 30, the ring 29 having a chamfered edge which engages with an asbestos ring 31 carried on a protruding flange at the bottom of the tank 5.

When not in use the apparatus may be drained of water via the outlet pipe 26 except for any water that is at a lower level than the wax nozzles 4 which cannot pass into the wax reservoir 2.

Various factors influence the sphericity of the beads 20 formed:

(a) the temperature of the molten wax;
(b) the size of the apertures of the nozzles 4 which determine droplet size;
(c) the shape of the nozzles 4 which affects the release of the droplets 21;
(d) the temperature of the water surrounding the nozzles which affects the release of the droplets 21;
(e) the temperature gradient in the water 19 through which the droplets 21 pass, (and thus, indirectly, the depth of the water 19);
(f) the rate at which wax flows through the nozzles 4.

In the embodiment illustrated the preferred temperature of the molten wax is 53° C. A useful range of temperatures would be from the melting point of the wax up to 120° C. A desired range of operation would lie between 10° C. to 40° C. higher than the melting point of the wax.

A useful range for the size of the apertures of the nozzles 4 would be between 0.8 to 6.4 mm and the desired range would be 0.8 to 4.0 mm.

The temperature of the water in the neighbourhood of the nozzles would have a useful range of between 0° C. to 20° C. higher than the melting point of the wax, with an upper limit of 97° C. A preferred value would be 5° C. higher than the melting point of the wax. The temperature gradient between the top and bottom of the tank 5 would be preferably approximately 20° C. over a length of 3 meters.

A useful range for the rate of flow of the wax through each nozzle would be between 2 and 6 kilogrammes/hour.

The manner in which the beads 20 are removed from the surface of the water 19 is also critical in that it must be a method which does not adversely affect the temperature gradient of the column of water 19 in the tank 5. The method employed must not, for instance, result in cooling of the water surrounding the wax nozzles at the bottom of the water column.

What I claim and desire to secure by letters patent is:

1. Apparatus for the production of beads from molten material including: a container for holding a liquid; an inlet in said container for conveying said material for release within the liquid; at least one bead-forming nozzle in a lower zone of said container connected to said inlet; means for maintaining a temperature gradient within said liquid such that the temperature of the liquid adjacent the nozzle exceeds the temperature at the surface; and means for removing solidified beads from the surface of the liquid.

2. Apparatus according to claim 1, wherein a heater is provided within the container, adjacent said nozzle.

3. Apparatus according to claim 2, wherein said heater is a steam coil.

4. Apparatus according to claim 1, wherein the means for removing beads, comprises: means for bleeding off said beads and a portion of said liquid; means for separating said beads and the bled off liquid; and means for drying said beads.

5. Apparatus according to claim 4, wherein said means for bleeding off said beads comprises a trough having a weir at one end, and nozzle means for issuing a fluid jet to drive the beads over the edge of the weir.

6. Apparatus according to claim 4, wherein the means for separating said beads from the bled off liquid comprises a separator having a baffle extending down into the separator, the beads being held on one side of the baffle, whilst the excess liquid is extracted from an outlet on the other side of the baffle.

7. Apparatus according to claim 4, wherein the means for drying said beads comprises an inclined tube having a perforated screen down which the beads roll, and means for passing air up through the perforations in the screen.

8. Apparatus according to claim 1, wherein the material is wax and the liquid is water.

* * * * *